US012516967B2

(12) United States Patent
Wilkinson

(10) Patent No.: US 12,516,967 B2
(45) Date of Patent: Jan. 6, 2026

(54) GAS SENSOR WITH DRIFT COMPENSATION

(71) Applicant: Matrix Sensors, Inc., San Diego, CA (US)

(72) Inventor: Paul R. Wilkinson, Carlsbad, CA (US)

(73) Assignee: Matrix Sensors Inc., San Diego, CA (US)

( * ) Notice: Subject to any disclaimer, the term of this patent is extended or adjusted under 35 U.S.C. 154(b) by 422 days.

(21) Appl. No.: 18/195,103

(22) Filed: May 9, 2023

(65) Prior Publication Data

US 2023/0358580 A1 Nov. 9, 2023

Related U.S. Application Data

(60) Provisional application No. 63/339,830, filed on May 9, 2022.

(51) Int. Cl.
| | |
|---|---|
| *G01D 21/02* | (2006.01) |
| *G01F 25/10* | (2022.01) |
| *G01N 21/17* | (2006.01) |

(52) U.S. Cl.
CPC ............. *G01D 21/02* (2013.01); *G01F 25/15* (2022.01); *G01N 21/1702* (2013.01); *G01N 2021/1704* (2013.01)

(58) Field of Classification Search
None
See application file for complete search history.

(56) References Cited

U.S. PATENT DOCUMENTS

| | | | |
|---|---|---|---|
| 2013/0209315 A1* | 8/2013 | Kimura | G01N 25/4826 422/88 |
| 2018/0143084 A1* | 5/2018 | Diether | G01D 3/022 |
| 2020/0394886 A1* | 12/2020 | Antar | G08B 17/10 |

* cited by examiner

*Primary Examiner* — Suman K Nath
(74) *Attorney, Agent, or Firm* — Fenwick & West LLP

(57) ABSTRACT

A sensor device and method to determine an amount of gas in the environment. The sensor device comprises at least one transducer. A sensing material (e.g., a metal-organic framework or a polymer film) is disposed on the transducer, and the sensing material captures an amount of the gas that depends on a temperature of the sensing material and a concentration or partial pressure of the gas. At least one detector or readout circuit is arranged to detect responses of the transducer as it captures gas in the sensing material and to output transducer measurement signals indicative of the responses of the transducer. At least one processor is arranged to process (e.g., demodulate) the transducer measurement signals according to the frequency of the temperature modulation. The processor determines the amount of gas according to the demodulated signals.

22 Claims, 9 Drawing Sheets

GAS SENSOR WITH DRIFT COMPENSATION

CROSS-REFERENCE TO RELATED APPLICATIONS

This application claims the benefit of U.S. Provisional Application No. 63/339,830, filed May 9, 2022, the contents of which are hereby incorporated by reference in their entirety.

TECHNICAL FIELD

The disclosure relates generally to sensors for detecting substances, and in particular to a gas sensor for monitoring the presence or quantity of a target gas in an environment with compensation for temperature drift and/or noise.

BACKGROUND

Chemical sensing of gases is an important technology in several fields including environmental monitoring, industrial safety, and public security. A range of sensors exist today to monitor carbon dioxide ($CO_2$), methane, carbon monoxide, toxic industrial compounds, and volatile organic compounds (VOCs) to name just a few. Depending on the application and target gas, different operating principles have been deployed, ranging from electrochemical cells, metal-oxide semiconductors, and non-dispersive infrared absorption. With growing concerns over indoor air quality for health, wellness and disease transmission; as well as greenhouse gas emissions driving climate change, there is an increasing demand for better, more scalable gas sensor technologies. A problem with existing gas sensing technologies is their lack of scalability in size, cost, and power consumption that is required to serve emerging mass-market applications.

One approach to a scalable gas sensor is a solid-state chip device based on a sensing material applied as a thin film coating to a transducer. This sensing material is generally engineered to absorb and desorb the target molecule with an adequate response time, and to not substantially absorb other interferent molecules, i.e., to have high selectivity. One challenge with this solid-state architecture, and with sensor technologies in general, is that the sensor performance may vary over time, this is often called, "long-term drift." The drift may be caused by slow changes in the sensing material, the transducer, the sensor package, and/or the readout electronics. This drift could manifest itself as a change to the baseline response, a change to the sensitivity, a change to the response time, and potentially other changes as well.

A common way to handle the problem of long-term drift is to periodically re-calibrate the sensor. This can be a burdensome process that increases the total ownership cost of the sensor. A relevant example are $CO_2$ sensors that are commercially available today. These are optical devices based on infrared absorption and manufacturers typically recommend manual recalibration every 6 to 12 months. This burden limits their viability for large-scale applications.

A device and method for substantially rejecting long-term drift and/or low frequency noise can help enable scalable gas sensor architectures.

SUMMARY

The disclosure provides a sensor device and method that decouples the sensor readout of gas concentration from low-frequency drift and/or low-frequency noise.

In an example configuration, a sensor device is configured for detecting a gas in an environment. The sensor device includes a sensing material configured to capture (e.g., adsorb, absorb) the gas from the environment. The degree of gas capture is based on a temperature of the sensing material and an amount of the gas in the environment. For example, at lower temperatures more gas is captured (e.g., via increased absorption), and at higher temperatures less gas is captured (e.g., via decreased absorption). The sensor device includes a thermal unit. The thermal unit is thermally coupled to the sensing material. The thermal unit is configured to generate a time-varying thermal signal which is configured to vary the temperature of the sensing material. That is, the thermal sensor creates an adjustable thermal environment. The sensor includes one or more transducers coupled to the sensing material. The one or more transducers are configured to sense a measure of the gas captured by the sensing material and generate one or more measurement signals representing the measure of the captured gas. The sensor includes one or more processors electrically coupled to the one or more transducers and the thermal unit. The one or more processors are configured to process the one or more measurement signals representing the measure of captured gas based on the time-varying thermal signal, and determine the amount of the gas in the environment based on the processed one or more measurement signals. The sensor is configured to generate an alert if the determined amount of gas in the environment is greater than a threshold. Alerts may include an audible noise, a visible signal, an electronic alert (e.g., to an email, or phone, or ventilation control system), etc.

The one or more processors are additionally configured to receive the one or more measurement signals representing the measure of captured gas from the one or more transducers, and receive the time-varying thermal signal from the thermal unit.

The thermal unit may include at least one thermal element. The at least one thermal element may thermally couple the thermal unit to the sensing material. The thermal unit may also be configured to heat or cool the sensing material using the time-varying thermal signal by, for example, driving the time-varying thermal signal to at least one thermal element. In so doing, the thermal element heats and cools according to the thermal signal, which thereby heats or cools the sensing material. In some examples, the one or more processors include the thermal unit and/or the at least one thermal element.

The one or more processors of the sensor device may be configured to process the one or more measurement signals representing the measure of captured gas by demodulating the one or more measurement signals using the time-varying thermal signal. Additionally, or alternatively, the one or more processors may be configured to process the one or more measurement signals representing the measure of captured gas by applying a fitting function to the one or more measurement signals and the time-varying thermal signal.

The thermal unit may generate the time-varying thermal signal at a frequency and the one or more processors process the one or more measurement signals by demodulating the one or more measurement signals using the frequency of the time-varying thermal signal. In some examples, the time-varying thermal signal may be a sinusoidal wave. In some additional examples, the time-varying thermal signal may be any one of a saw-wave, a square wave, a triangle wave, a non-linear signal, or a non-periodic signal as the time-varying thermal signal.

The one or more transducers of the sensor device may include one or more of an electrical transducer, an optical transducer, an acoustic transducer, or an inertial transducer. For instance, in some example configurations, the one or more transducers may include a mass transducer. The mass transducer may sense the measure of gas captured by the sensing material by measuring changes of a mass of the sensing material as it captures the gas.

In some example configurations, the one or more transducers may include a chemiresistor. The chemiresistor may include a first electrical contact coupled to a first side of the sensing material and a second electrical contact to a second side of the sensing material. The chemiresistor may sense the measure of gas captured by the sensing material by measuring changes in resistance of the chemiresistor when the sensing material captures the gas.

In some example configurations, the one or more transducers may include a chemicapacitor. The chemicapacitor may include a first conductive plate coupled to a first side of the sensing material and a second conductive plate coupled to a second side of the sensing material, and the chemicapacitor senses the measure of gas captured by the sensing material by measuring changes in capacitance of the chemicapacitor when the sensing material captures the gas.

In some example configurations, the sensing material may be a metal-organic framework or covalent organic framework configured to capture gas. In some example configurations, the sensed gas is carbon dioxide, methane, or hydrogen.

The one or more processors may additionally process the one or more measurement signals representing the measure of captured gas based on the time-varying thermal signal to account for a thermal drift of the sensing material in the environment.

The thermal unit may additionally be configured to modulate the temperature of the sensing material according to a temperature modulation frequency using at least one symmetric or asymmetric waveform. The one or more processors may demodulate the measurement signals according to the temperature modulation frequency, and/or integer multiples of the temperature modulation frequency. Moreover, the one or more processors may determine the amount of the gas according to the amplitude or magnitude of the measurement signals.

The thermal unit may modulate the temperature of the sensing material sinusoidally with a period of tau minutes. Tau may be in the range of, e.g., 0.1 to 10 minutes, but other tau's are also possible.

Additionally, the sensor device may perform a method for detecting a gas in an environment. For example, the sensor device may vary, using a time-varying thermal signal, a temperature of a sensing material. The sensing material is configured to capture the gas from the environment based on the temperature of the sensing material and an amount of the gas in the environment. The sensor device may sense, using a transducer coupled to the sensing material, a measure of the gas captured by the sensing material as the temperature is varied. The sensor device may generate, using a measurement circuit electrically coupled to the transducer, one or more measurement signals representing the measure of the gas captured by the sensing material. The sensor device may process, using a processor, the one or more measurement signals representing the measure of captured gas using the time-varying thermal signal. The sensor device may determine the amount of gas in the environment based on the processed one or more measurement signals. In response to the determined amount of gas being above a threshold, the sensor device may generate an alert.

BRIEF DESCRIPTION OF THE DRAWINGS

The foregoing aspects and advantages of the present disclosure will become better understood upon reading the following detailed description and upon reference to the drawings where.

DETAILED DESCRIPTION

Figure 1:
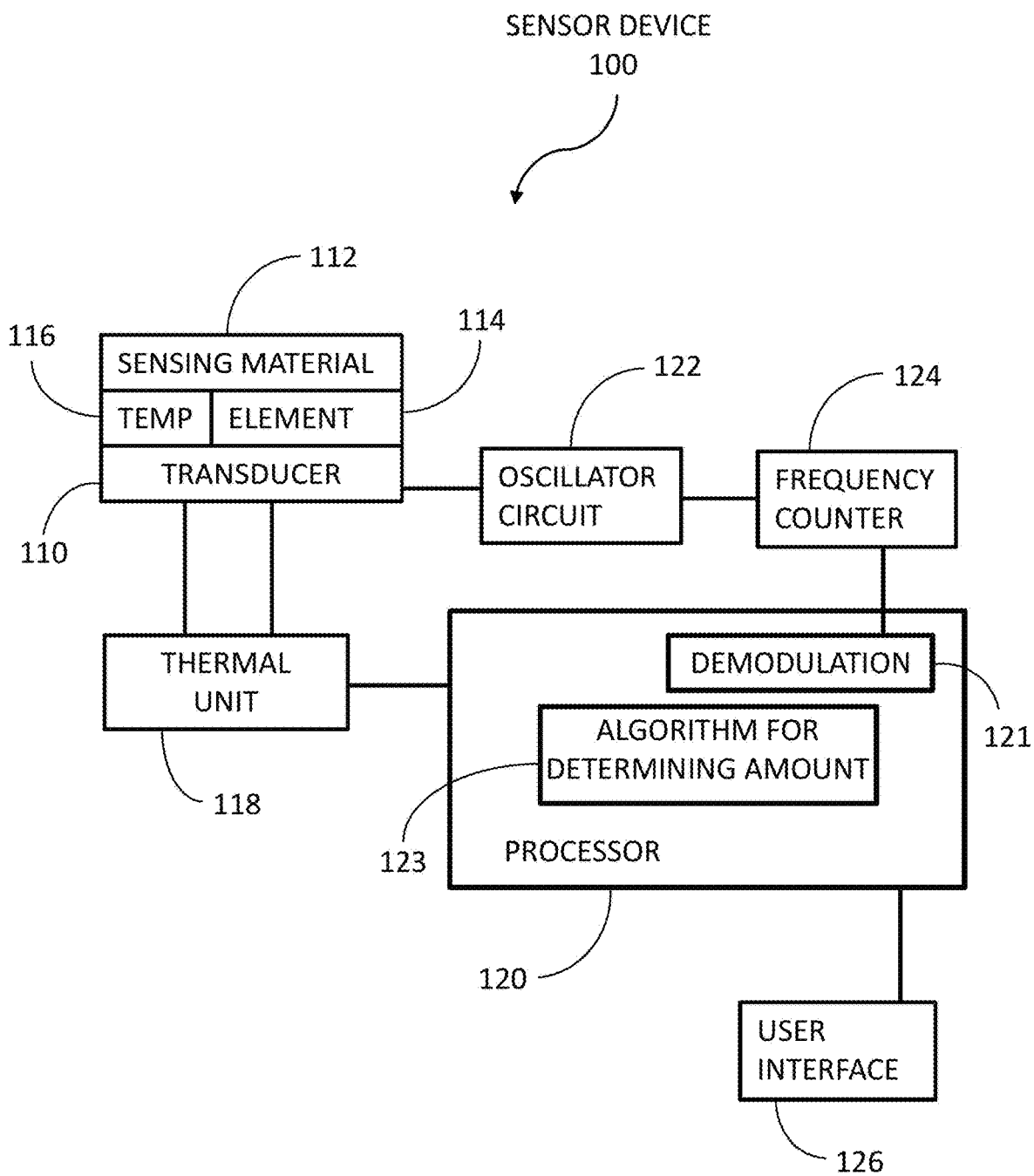
FIG. 1 shows a schematic block diagram of a sensor device for determining an amount of a gas in an environment, according to an embodiment.

In the following description, it is understood that all recited connections between structures can be direct operative connections or indirect operative connections through intermediary structures. An element includes one or more elements. Any recitation of an element is understood to refer to at least one element. A plurality of elements includes at least two elements. Unless otherwise required, any described method steps need not be necessarily performed in a particular illustrated order. A first element (e.g., a signal or data) derived from a second element encompasses a first element equal to the second element, as well as a first element generated by processing the second element and optionally other signals or data. Making a determination or decision according to (or in dependence upon) a parameter encompasses making the determination or decision according to the parameter and optionally according to other signals or data. Unless otherwise specified, an indicator of some quantity/data may be the quantity/data itself, or an indicator different from the quantity/data itself such as a signal from which the quantity/data can be determined.

In some embodiments, this disclosure provides computer systems comprising hardware (e.g., one or more processors or microprocessors and associated memory) programmed to perform the methods or functions described herein, as well as computer-readable media encoding instructions to perform the steps described. In some embodiments, a look-up table, calibration curve or function is used to determine the quantity of each substance of interest (e.g., a target gas like $CO_2$), according to the signals or data indicating the transducer responses. The look-up table, calibration data, or function may be in one or more processors and associated memory included with the sensor device. In some embodiments, an on-board processor is programmed to perform temperature control, demodulation functions, regressive analysis (e.g., curve-fitting), or store measured signal values and/or to determine gas quantities.

Alternatively, at least some of these steps or functions may be performed in a separate processor or external computer in communication with the sensor portion of the device, with or without wires. Various wireless communication techniques are possible. Some of these steps or functions may be implemented as an analog or digital circuit. In other embodiments, the sensor has only some signal processing electronics, and some determination and calculation functions are performed in a separate processor or external computer in communication with the sensor. Alternatively, multiple processors may be provided, e.g., providing one or more signal processing electronics or processors in the sensor that communicate (wirelessly or with wires) with one or more external processors or computers.

For simplicity in patent drawings, a single controller or processor is described in the embodiments below. It is to be understood that the sensor device may include multiple processors and/or associated memories, as well as analog or digital circuits. In some embodiments, at least one on-board processor or controller receives capacitor or transducer measurement signals/data and temperature measurement signals/data, either through direct connections or indirectly through one or more additional signal processing circuits or processor components. For example, the signal demodulation function can be performed by several methods, implemented as an analog or digital circuit, or in the software of a processor.

I. Introduction

A sensor device detects gas in an environment. The sensor device uses a transducer coupled to a sensing material. In particular, transducers detect substances using a sensing material that adsorbs or absorbs (i.e., captures) molecules of a target gas (e.g., $CO_2$). The sorption of the gas molecules in the sensing material changes properties that are reflected in a response of the transducer (e.g., a frequency shift). In traditional gas sensors, drift is an important issue that impairs the reliability of gas sensing systems. Sensor aging, memory effects and environmental disturbances produce shifts in sensor responses. This disclosure provides devices and methods that overcome long-term drift of a gas sensor that relies on a sensing material that selectively absorbs and desorbs the target gas.

II. First Example Sensor Device

FIG. 1 shows a schematic block diagram of a sensor device 100 for determining an amount of a gas in an environment, according to an embodiment. The sensor device 100 includes a sensing material 112, a temperature sensor 116, a thermal element 114, a transducer 110, an oscillator circuit 112, a frequency counter 124, a thermal unit 118, a processor 120 and a user interface 126.

The processor 120 may include an algorithm 123 for determining an amount of gas in the environment and/or a demodulation system 121 to aid the processor 120 in determining the amount of gas. The sensor device 100 may include additional or fewer elements or systems, and the elements or systems may be connected or disposed in different manners. Additionally, functionality attributed to one element or system, may be provided by another element or system.

II.A Sensing Material

The sensor device 100 comprises a sensing material 112. The sensing material 112 is configured to capture (e.g., sorb, adsorb, desorb, etc.) an analyte such as a gas (e.g., carbon dioxide) if the analyte is present in the environment of the sensing material 112. The degree of gas capture is based on a temperature of the sensing material 112 and an amount of the gas (or analyte) in the environment. For example, at lower temperatures the sensing material 112 captures more gas (e.g., via increased absorption), and captures less gas at higher temperatures (e.g., via decreased absorption). Similarly, for example, the sensing material 112 captures more gas at higher concentrations of gas in the environment, and at less gas at lower concentrations of gas in the environment. The sensing material 112 may also capture analytes in other substances such as, e.g., liquids.

The sensing material 112 may be a porous crystalline material such as a metal-organic framework (MOF), porous coordination polymer, or porous coordination framework. Preferred MOF subclasses include Zeolitic imidazolate framework (ZIF), IRMOF, and Multivariate MOF (MTV-MOF) made using a mix of organic linkers having the same geometry but varied chemical functionality. Suitable porous sensing materials also include a covalent organic framework (COF) in which the framework includes covalent chemical bonds rather than metal coordination bonds, and Zeolite which is a class of inorganic porous crystalline materials. In some embodiments, the porous sensing materials comprise non-crystalline porous materials such as Metal-organic Polyhedron having discreet porous cages, Porous metal-organic polymer, Metal-organic gel, or Porous Carbon (also known as activated carbon).

Metal-organic frameworks (MOFs) are an expanding class of porous crystalline materials that are built up from nodes of metal ions connected by organic linkers. These materials can typically be engineered to have pore apertures with a width or diameter in a range of less than 1 Angstrom to about 30 Angstroms, but could be other widths or diameters. A class of exotic MOFs ("MOF-74") with pore aperture diameters of 98 Angstroms have also been demonstrated. MOFs with varying pore sizes can selectively adsorb molecules based on the size of the molecules. For example, engineered MOFs with pore sizes designed for carbon dioxide ($CO_2$) adsorption can separate gases in industrial processes. MOFs can also be used as sensing material with a QCM to act as a chemical sensor in controlled environments. When one or more types of MOFs is used as a sensing material on a resonant sensor (e.g., transducer 110), the surface on which the MOF is grown may be prepared for MOF growth with a self-assembled monolayer (SAM) or by deposition of either an oxide or metal surface. The MOF coating on the oscillating portion of the sensor typically has a thickness in the range of 1 to 10,000 nm, but could be other thickness. MOFs can be designed with different pore sizes and specific chemical affinities to target specific gases with high selectivity.

In other embodiments, the sensing material 112 is a polymer film. The polymer sensing material is selected to fit the mechanical properties of the resonator (elasticity, density, thickness, etc.), so that detection time is reduced or minimized and sensitivity is increased or maximized. Sensors may be coated or functionalized with various types of sensing materials for specific applications. These possible sensing materials include, for example, porous receptor materials as listed above, polymers (co-polymers, bio-polymers), sol gels, and DNA, RNA, proteins, cells, bacteria, carbon nanotube arrays, catalysts including metals to enzymes, nanoclusters, organic and inorganic materials including: supramolecules, metal-organic complexes, or dendritic materials.

In some embodiments, the sensing material 112 is from a family of porous metal-organic framework materials known as amine-appended $M_2$(DOBPDC). Such materials exhibit characteristic gas uptake behavior that varies with temperature and the concentration of the target gas (e.g., $CO_2$). In particular, the material mmen-$Mg_2$(DOBPDC) exhibits an impressive 14 weight percent $CO_2$ uptake that depends on temperature and the concentration of $CO_2$.

As described briefly above, the sensing material 112 can be configured to detect a variety of different analytes from different phases of matter. For example, the sensing material 112 can be configured to absorb: gases such as carbon dioxide, carbon monoxide, methane, hydrogen, volatile organic compounds, toxic gases, chemical warfare agents, greenhouse gases, combustibles, and refrigerants; and liquids such as glucose and lead. Correspondingly, the sensor device can be configured to detect the various analytes using the methods described herein.

II.B Transducers

The sensor device 100 includes a transducer 110. The transducer 110 is configured to sense a measure of the gas captured by the sensing material 112 and generate one or more measurement signals representing the measure of the captured gas. As described in greater detail below, the transducer 110 may include or utilize various additional elements of the sensor device 100 (e.g., oscillator circuit 122 and/or frequency counter 124) to generate measurement signals.

In an example embodiment, the transducer 110 is a mass transducer. For example, the transducer 110 may be a resonant mass transducer such as a quartz crystal microbalance (QCM). The transducer 110 may be other types of transducers such as a capacitor (chemicapacitor), a resistor (chemiresistor), a gravimetric transducer, an optical transducer or the like. Some particular example mass transducers may include Micro-Electro-Mechanical Systems (MEMS) transducers, a calorimeter, a surface acoustic wave (SAW) device, a BAW transducer, a cantilever, or a capacitive micromachined ultrasonic transducer (CMUT).

Given the variability of transducers that may be employed by the sensor device 100, the various measurement signals created by those transducers are also manifold. Typically, the measurement signal corresponds to the type of transducer employed. For instance, a chemicapacitor's measurement signal may reflect a capacitance measurement of the sensing material, a chemiresistor measurement signal may reflect a resistance measurement of the sensing material, and a mass transducer may reflect a mass measurement of the sensing material, but other examples are possible. Generally, the transducer generates a measurement signal by measuring an appropriate change in the transducer characteristics such as frequency, quality factor, stiffness, strain, optical characteristics, etc. Whatever the case, the transducer 110 measures an amount of gas captured by generating a measurement signal representing the amount of captured gas.

To continue, the transducer 110 is coupled to the sensing material 112 such that the transducer 110 is able to sense captured gas and create a measurement signal. Again, depending on the type of transducer, the transducer may be coupled to the sensing material 112 in a variety of ways. For instance, the sensing material 112 may be physically coupled or disposed (e.g., coated) for a mass transducer, optically coupled for an optical transducer, or electromagnetically coupled for, e.g., a chemicapacitor or chemiresistor.

Additionally, as described above, the transducer 110 may include or may be coupled to various elements of the sensor device to generate measurement signals. For example, the sensor device may also include at least one detector (e.g., a readout circuit for a resonant mass transducer) arranged to detect responses of the transducer 110 when substances (e.g., molecules of the target gas and/or water molecules) are adsorbed or absorbed in the sensing material 112. The readout circuit outputs transducer measurement signals indicative of the transducer responses. In some embodiments, the transducer 110 is a resonant mass transducer (e.g., a QCM), the transducer responses to mass changes in the sensing material 112 are frequency shifts, and the detector is a readout circuit comprising an oscillator circuit 122 that drives the transducer 110 and a frequency counter 124 that measures the transducer frequency (e.g., resonance frequency or frequency shifts). The oscillator circuit 122 and the frequency counter 124 output the transducer measurement signals to the processor 120. In various example configurations, the oscillator circuit and/or frequency counter may be included in the transducer 110 itself, or may be included in the processor 120. Furthermore, in various example configurations, different systems may be used generate a measurement signal and may be included in the sensor device 100.

Finally, in many of the embodiments described herein, a QCM has been described as the transducer 110, and an oscillator circuit 122 and the frequency counter 124 are the detector, and resonant frequency signals of the QCM are the "transducer measurement signals". However, there are many other suitable transducers 110, detection mechanisms for those transducers, and transducer measurement signals output from those detectors that may be employed. Transducer responses that may be detected and output as transducer measurement signals include a change in frequency, resonance frequency, dissipation, quality factor, stiffness, or strain, etc. The responses of the resonant transducer to mass loading in the sensing material 112 are often detected using an electrical property, such as a change in impedance of the circuit driving an oscillating motion of the transducer 110 (e.g., a phase-locked loop determines phase of the impedance).

II.C Thermal Unit

The sensor device 100 includes a thermal unit 118. The thermal unit 118 is configured to vary the temperature of the sensing material. To do so, the thermal unit 118 may generate a thermal signal. The thermal signal, as described in greater detail below, creates an adjustable thermal environment for the sensing material 112. In an example implementation, the thermal unit 118 may generate a time-varying thermal signal that varies (e.g., modulates) the temperature of the sensing material 112 (e.g., by heating and/or cooling) at a frequency. The thermal signal may do so using an analog or digital temperature control loop, may be an open loop control, or may not use a control loop. The thermal unit 118 may generate a thermal signal that modulates the temperature of the sensing material using at least one symmetric or asymmetric waveform (e.g., sine wave, triangle wave, square-wave, saw-wave, etc.), or using a plurality of simultaneous, additive combinations of such simple waveforms. In some embodiments, the waveforms or temperature profile to which the sensing material is subjected may include periods of constant temperature. The thermal unit 118 may be a standalone device, included in the processor, or controlled by the processor, depending on the configuration of the sensor device.

The thermal unit 118 is thermally coupled to the sensing material. Thermally coupled indicates that the thermal unit 118 is coupled to the sensing unit in such a way that it can heat or cool the sensing material 112. For instance, thermally coupled may indicate that the thermal unit 118 is directly or indirectly coupled (via another device) to the sensing material 112 such that it may heat or cool the sensing material 112. In another example, thermally coupled may indicate that the thermal unit 118 is adjacent to the sensing material 112 such that it may radiatively (or conductively, or convectively) heat or cool the sensing material 112. Whatever the coupling, the thermal unit 118 generates a thermal signal that adjusts the thermal environment of the sensor device 100.

The thermal unit 118 may be thermally coupled to at last one thermal element 114, and the thermal element 114 may be coupled to the sensor device 100 and/or transducer 110. The term "thermal element" means at least one heater, or optionally a device that provides both heating and cooling. For example, in some embodiments, the thermal element is a resistive or inductive heater, and passive cooling is used. In some embodiments, the sensor device 100 may optionally include an active cooling element. In other embodiments, the thermal element 114 provides both active heating and cooling, in which case the thermal element 114 is a thermoelectric device (TED) that heats and cools the sensing material 112. Additionally, thermal element 114 may be any suitable heating elements. Those elements may include conductive heaters, convection heaters, or radiation heaters. Examples of conductive heaters include resistive or inductive heating elements, e.g., resistors or thermoelectric devices. Convection heaters include forced air heaters or fluid heat-exchangers. Suitable radiation heaters include infrared or microwave heaters. Similarly, various cooling elements may be used to cool the sensing material 112. For example, various convection cooling elements may be employed such as a fan, Peltier device, refrigeration device, or jet nozzle for flowing cooling fluids. Additionally, the thermal element 114 may include various conductive cooling elements, such as a heat sink, e.g., a cooled metal block. The thermal element 114 may be incorporated into the transducer 110, such as a resonator with an integrated heater and/or temperature sensor.

The thermal unit 118 may include a temperature sensor 116 arranged to measure a temperature of the sensing material 112. The measured temperature may be included in the thermal signal and/or may be an additional thermal signal usable by the processor 120. In some embodiments, the temperature sensor 116 is integral with the thermal element 114, for example there are some heaters (e.g., resistive heaters) that also perform temperature sensing by measuring an electric property of the heater circuit. Alternatively, the temperature sensor 116 may be a separate element from the thermal element 114, e.g., the temperature sensor 116 may be a thermistor, thermocouple, or a resonant temperature sensor such as a temperature-sensitive cut of a quartz resonator, or temperature derived from the temperature dependence of at least two resonant modes of a mechanical resonator.

The thermal unit may additionally be configured to modulate the temperature of the sensing material according to a temperature modulation frequency using at least one symmetric or asymmetric waveform. As described below, the one or more processors may demodulate the measurement signals according to the temperature modulation frequency, and/or integer multiples of the temperature modulation frequency. Moreover, the one or more processors may determine the amount of the gas according to the amplitude or magnitude of the measurement signals. The thermal unit may modulate the temperature of the sensing material sinusoidally with a period of tau minutes. Tau may be in the range of, e.g., 0.1 to 10 minutes, but other tau's are also possible.

The position of the thermal element 114 (e.g., a heater) and the temperature sensor 116 (which may be integral with the thermal element 114) with respect to the transducer 110 and the sensing material 112 may be different for different embodiments and applications of the sensor device. For example, FIG. 1 shows an embodiment in which the thermal element 114 and the temperature sensor 116 are positioned between the sensing material 112 and the resonant transducer 110. Additionally, depending on the configuration, the thermal element 114 and temperature sensor 116 may be integrated into the thermal unit 118 or processor 120.

In aggregate, the thermal unit 118 generates a thermal signal (e.g., a time-varying signal) to vary the temperature of the sensing material 112, transducer 110, and/or environment. In some examples, to do so, the thermal unit 118 drives a thermal signal to the thermal element 114. The thermal element 114 inputs the thermal signal and introduces or removes heat from the sensing material 112 based on the thermal signal. For instance, the thermal element 114 may radiate heat into the sensor device based on the thermal signal or may directly introduce heat into the sensor device based on the thermal signal. In this case, the thermal unit 118 generates a thermal signal that induces temperature changes in the sensing material 112, which thereby changes the ability of the sensing material 112 to capture gas.

II.D Processor

The sensor device 100 includes a processor 120. The processor is electrically coupled to the thermal unit 118, the transducer 110, and/or elements of the sensor device 100 that generate transducer measurement signals and thermal signals. The processor 120 is configured to, as described in greater detail below, process the one or more measurement signals representing the measure of captured gas based on the (e.g., time-varying) thermal signal, and determine the amount of the gas in the environment based on the processed one or more measurement signals and thermal signal.

In an example, the processor 120 processes the measurement signals using demodulation techniques. As such, the sensor device includes a demodulation function 121, such as phase-sensitive (also known as lock-in) detection. In this case, the processor 120 reads out a complex number (mathematical definition, containing a nonzero imaginary component) that can be expressed as real, imaginary, magnitude, and/or phase. The processor 120 demodulates the transducer measurement signal at a frequency of the thermal signal (or at integer multiples (overtones) of the thermal signal). The measurement signal can be demodulated by several methods, implemented as an analog or digital circuit, or in software of the processor 120.

As an example of demodulation 121, the processor 120 may use lock-in amplifiers to demodulate the measurement signals. Lock-in amplifiers use the knowledge about a signal's time dependence to extract it from a noisy background. A lock-in amplifier performs a multiplication of its input with a reference signal, and then applies an adjustable low-pass filter to the result. This method is termed demodulation or phase-sensitive detection and isolates the signal at the frequency of interest from all other frequency components. The reference signal is usually a sine wave but could have other forms, too. Demodulation with a pure sine wave enables selective measurement at the fundamental frequency or any of its harmonics. Some instruments use a square wave which also captures all odd harmonics of the signal and, therefore, potentially introduces systematic measurement errors. It is understood that the modulation frequency may not be constant for a sensor, that the modulation frequency may be intentionally changed periodically during operation.

In an example, the processor 120 is also programmed with an algorithm 123 to determine an amount (e.g., concentration, mass, or partial pressure) of the target gas according to the processed (e.g., demodulated) signals. In various examples, the processor 120 determines the amount of gas in the environment using a function, look-up tables or calibration curves stored in the memory of the processor 120 that relate demodulated signal values to the concentration of the target gas in the environment or sample. More generally, the processor 120 is configured to employ any viable technique to determine the amount of gas in the environment by processing the transducer measurement signals and thermal signals.

The sensor device 100 may include a user interface 126. The user interface 126 may include a display for displaying a quantity of the target gas (e.g., concentration, mass or partial pressure), speakers or other mechanisms for communicating or alarming at certain gas concentrations (e.g., above a threshold amount of gas), and at least one user-input device for selecting parameter values, such as a target or threshold concentration of the gas at which an alarm should be initiated. Alternatively, the processor 120 may include program instructions to alert another device or external computer that there is an alarm at a target or threshold concentration. For example, an alarm signal is set that can be communicated to another system, such as a building ventilation control system.

III. Example Processing Techniques

Figure 2A:
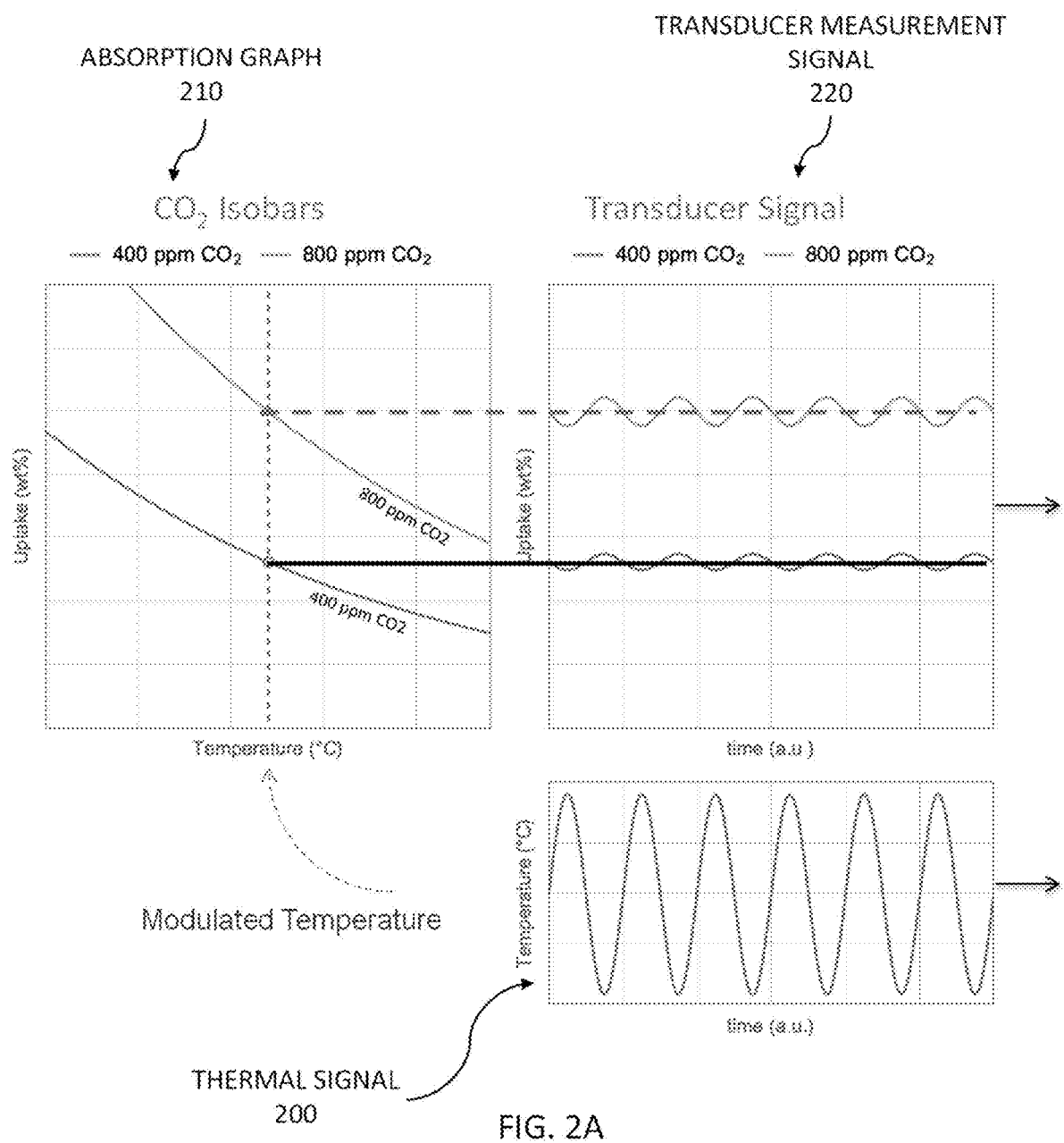
FIGS. 2A and 2B illustrate graphically a first example of operation of the sensor device, according to an example embodiment.
Figure 2B:
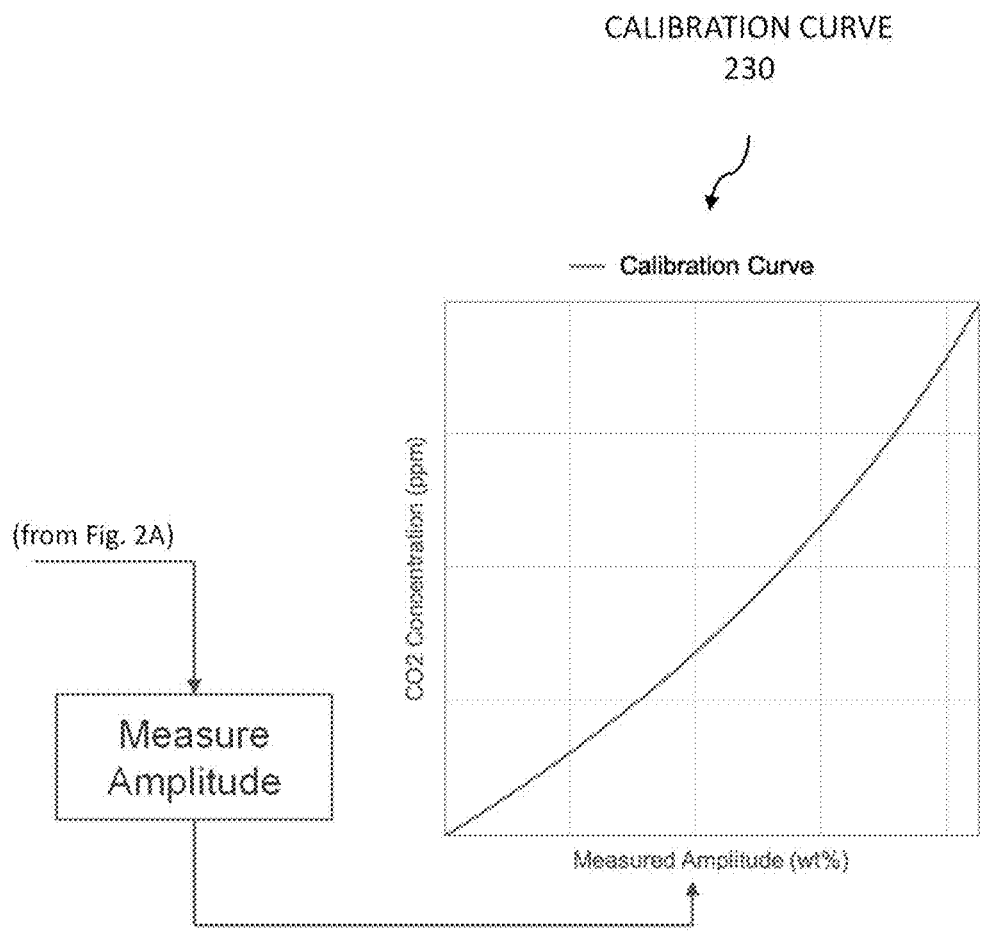

As described above, the sensor device (e.g., sensor device 100) determines an amount gas in an environment. FIGS. 2A and 2B illustrate graphically a first example of operation of the sensor device, according to an example embodiment. As shown in FIG. 2A, the thermal unit generates a thermal signal 200 that varies the temperature of the sensing material (e.g., sensing material 112). In this case, the sensing material is heated according to a sinusoidal temperature modulation (e.g., between a low temperature of 40° C. and a high temperature of 45° C., although other temperature ranges are possible). In this example, the sensor temperature is modulated sinusoidally with a period of tau minutes (tau typically in the range of 0.1 to 10 minutes, with some example implementations using 2 minutes).

The sensing material captures (e.g., adsorbs or absorbs) an amount of the target gas that depends on both the temperature of the sensing material and the concentration (or partial pressure) of the target gas that is being measured. An example of temperature-dependent gas absorption in the sensing material is illustrated as the absorption graph 210.

As the sensor temperature increases in the sinusoidal pattern, the absorbed gases are desorbed from the sensing material, so that there is less gas uptake indicated by the transducer signals. Conversely, as the temperature of the sensing material falls, gases are reabsorbed into the sensing material, and there is greater gas uptake indicated in the transducer signals. Accordingly, as the thermal signal varies the temperature of the sensing material, a transducer measurement signal 220 representing the amount of gas captured by the sensing material also varies.

As shown in FIG. 2B, the processor (or other elements of the sensor device) measures the amplitude (or magnitude or some other characteristic) of the transducer signal (e.g., a transducer measurement signal 220). The transducer measurement signal, in this example, represents gas uptake in the sensing material as the temperature is modulated in the pattern of a sine wave. The amplitude of the transducer signal is then used to calculate the quantity of target gas, e.g., using a function or calibration curve 230 that relates the measured amplitude to gas concentration. The calibration curve 230 may also take into account the thermal signal generated by the thermal unit. When using sinusoidal temperature modulation, the processor greatly reduces the long-term drift of the sensor, since the desired gas signal is encoded on the modulation signal (gas absorbs and desorbs at the modulation frequency). The approach also reduces noise by transposing the signal corresponding to absorbed gas far out of the 1/f measurement noise associated each transduction scheme.

Figure 3:
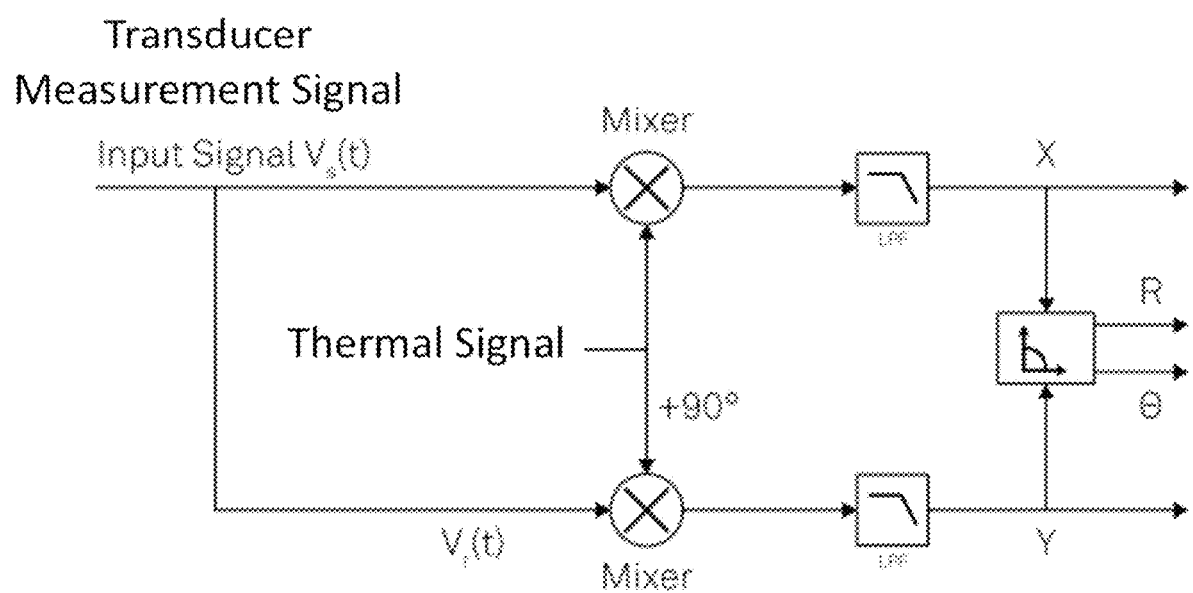
FIG. 3 is a block diagram showing amplitude measurement via lock-in demodulation, according to an example embodiment.

FIG. 3 shows an example block diagram of processing signals to determine the amount of gas in the environment. In particular, FIG. 3 shows a schematic block diagram of amplitude measurement via lock-in demodulation. In the illustrated example, the input signal is, e.g., the transducer measurement signal representing an amount of gas captured by the sensor device (e.g., mass uptake, or capacitance. Additionally, in the illustrated example, the reference signal is the thermal signal. The input signal is multiplied by the reference signal and a 90° phase-shifted version of the reference signal. The mixer outputs are low-pass filtered to reject the noise and the $2\omega$ component, and finally converted into the magnitude, R, and the phase difference between the signals, theta. The output signal is processed to determine the amount of gas in the environment.

In another embodiment the amplitude measurement of the transducer signal is performed by Phase Locked Loop (PLL) demodulating a frequency modulated (FM) signal. Mass uptake is computed from the resonator frequency, so the modulated uptake signal is equivalently a modulated frequency (FM).

IV. Second Example Sensor Device

Figure 4:
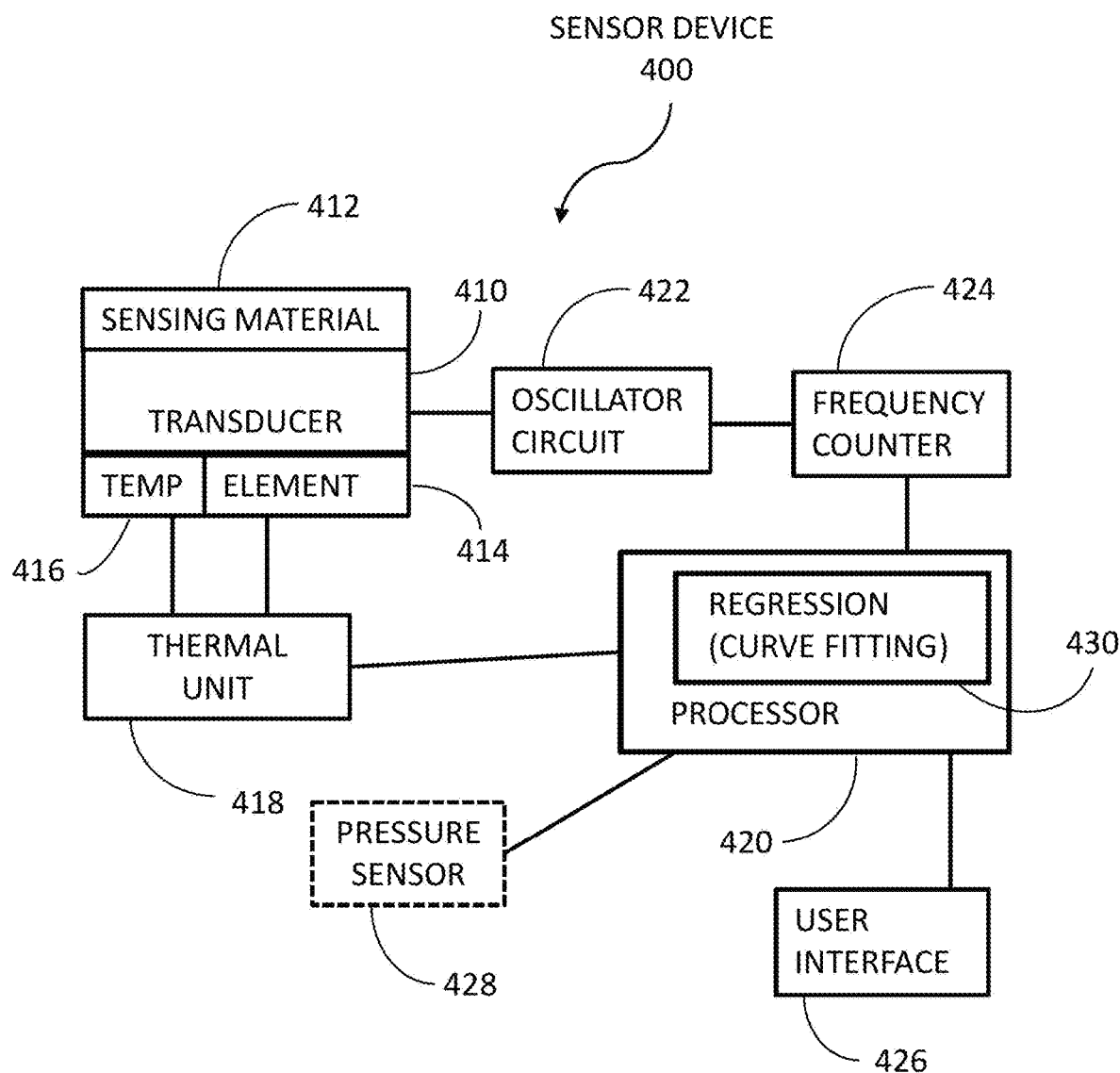
FIG. 4 is a block diagram of a sensor device, according to an example embodiment.

FIG. 4 shows a sensor device 400 for monitoring a target gas, according to an example embodiment. The sensor device 400 of FIG. 4 is largely similar to the sensor device of FIG. 1. The sensor device 400 is configured to determine an amount of gas in the environment based on transducer measurement signals and thermal signals. To do so, the sensor device 400 generates a thermal signal that varies the temperature of the sensing material 412. The sensor device 400 employs a transducer 410 to measure gas capture in a sensing material 412, where the amount captured is based on temperature and the concentration of gas. The transducer 410 generates a transducer measurement signal representing the amount of gas captured, and may employ an oscillator circuit 422 and frequency counter 424 to do so. A processor 420 processes the signals to determine the amount of gas in the environment. The processor may display determined gas concentrations on the user interface 426.

There are some structural differences between the sensor device of FIG. 1 and that illustrated in FIG. 4. For example, the thermal element 414 and the temperature sensor 416 are positioned on the backside of the resonant transducer 410 (e.g., a QCM), with the sensing material 412 disposed (e.g., coated, deposited or grown) on the topside of the transducer 410. This is a convenient arrangement of parts when the transducer 410 is a QCM having topside and backside electrodes positioned on opposing sides of a quartz substrate. In this example, the thermal element 414 and temperature sensor 416 are a resistive heater and a thermistor positioned on the backside of the QCM, and the sensing material 412 (e.g., a MOF) is positioned on the topside of the QCM (e.g., disposed over the top electrode of the QCM), but other arrangements are possible.

In many embodiments, the action of heating/cooling the transducer 410 and measuring the temperature of the transducer 410 is sufficient to also heat/cool the sensing material 412 and measure the temperature of the sensing material 412, since the sensing material 412 will be at the same temperature as the transducer 410. It is not necessary to have direct physical contact between the sensing material 412, the thermal element 414 and the temperature sensor 416. So long as there is adequate thermal coupling between these elements of the device, the temperature sensor 416 positioned on the backside of the transducer 410 will be at nominally the same temperature as the sensing material 412, and heat will be able to flow from the thermal element 414 through the transducer 410 to the sensing material 412.

Optionally, the sensor device includes at least one pressure sensor 428 for sensing the ambient or atmospheric pressure in some embodiments. The ambient or atmospheric pressure should not be confused with the partial pressure of a target gas, which term partial pressure we are using as synonymous with the concentration of the target gas. An ambient pressure sensor 428 may be useful for applications of the sensor device 400 in which the ambient or atmospheric pressure may differ from standard atmospheric pressure, and adjustments to the calculation of the concentration of the target gas may include ambient pressure measurements. For example, the processor 420 may use the pressure signal, thermal signal, and transducer measurement signal to determine the amount of gas in the environment.

In this embodiment, the processor 420 also includes at least one algorithm that determines the amount of gas using regression or curve-fitting techniques. In this case, the processor 420 again processes the transducer measurement signal representing to the amount of gas that adsorbs and desorbs (e.g., is captured) in the sensing material 412 due to the changing temperature. The temperature variation may be represented by the thermal signal. The processor 420 then applies regression (curve-fitting) 430 to the signal to extract curve-fit parameters associated with the amount of target gas. The curve-fitting algorithm may be implemented as an analog or digital circuit, or in software of the processor 420.

Figure 5:
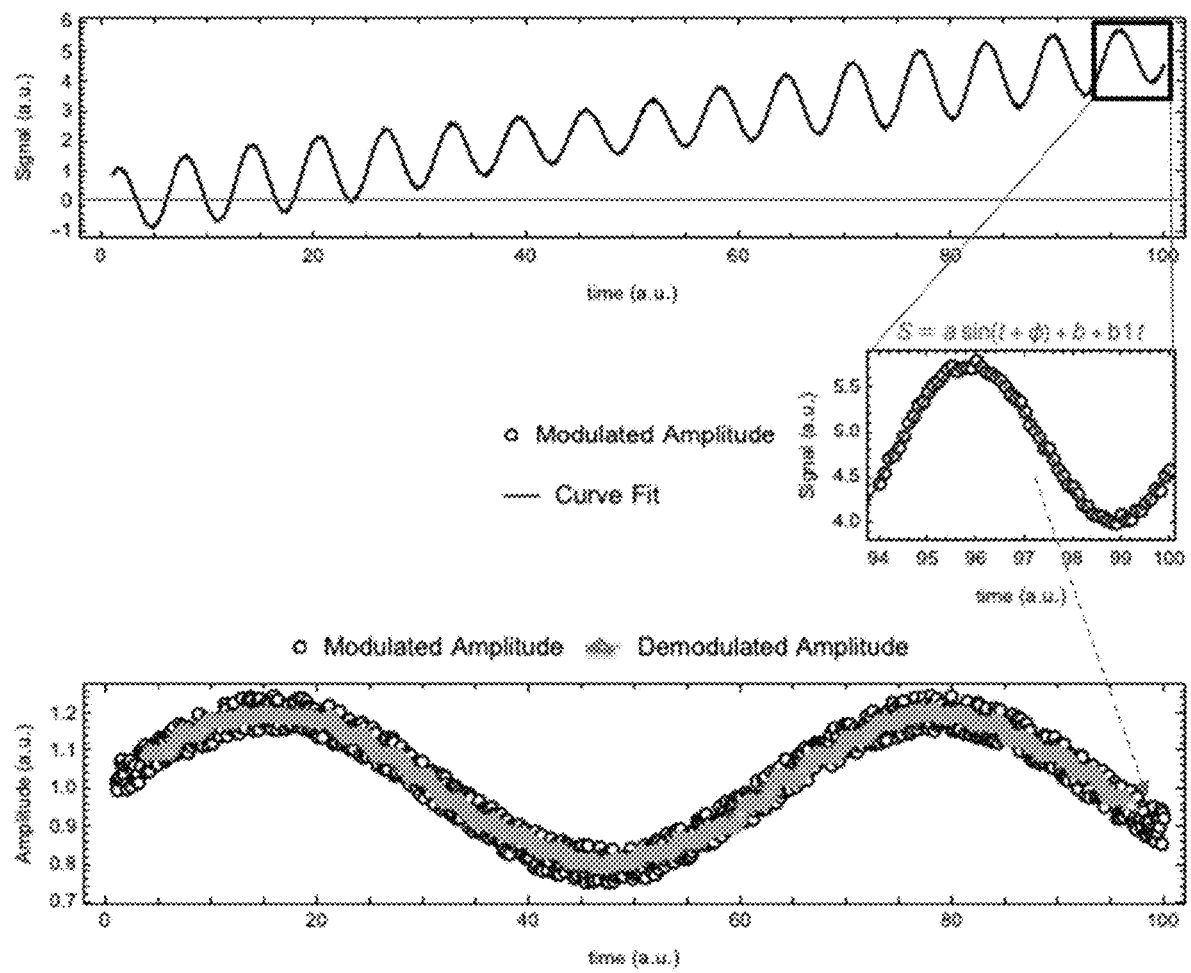
FIG. 5 shows a schematic representation of a suitable curve-fitting algorithm, according to an example embodiment.

FIG. 5 shows a schematic representation of a suitable curve-fitting algorithm, according to an example embodiment. The algorithm cycles through the following steps: 1) Select the most recent N points of the data signal corresponding to between ½ and 3 modulation periods; 2) Fit the selected N points to a sinusoidal function where amplitude, phase, and offset are free parameters; 3) Record the fit parameters, especially the amplitude and phase. The amplitude and phase may optionally be converted to real and imaginary part using Euler's relation; 4) As each new signal measurement is recorded, the new signal measurement is appended to the N-point subset and the oldest signal measurement is discarded, so that the selection window shifts by one measurement point; 5) Repeat the curve-fit for the new N-point subset and record the new curve fit parameters. In this manner, a time-varying demodulation signal is constructed. Each curve-fit represents a single amplitude and a single phase for that interval. The curve-fit window shifts to incorporate each new measurement.

V. Third Example Sensor Device

Figure 6:
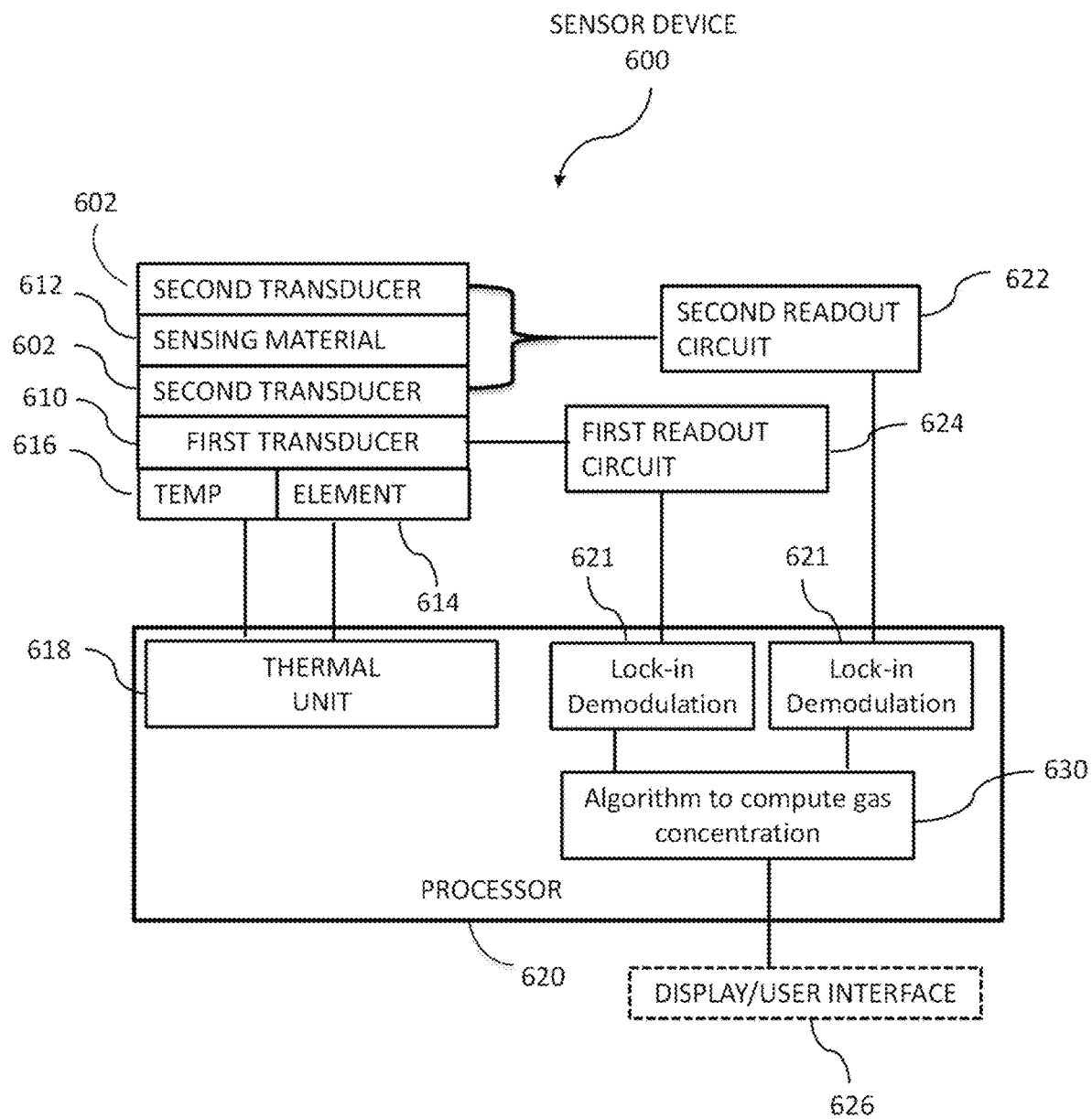
FIG. 6 shows a block diagram of a sensor device, according to an example embodiment.

FIG. 6 shows a block diagram of a sensor device 600, according to an example embodiment. The sensor device 600 of FIG. 6 is similar to the sensor device of FIG. 1. The sensor device 600 is configured to determine an amount of gas in the environment based on transducer measurement signals and thermal signals. To do so, the sensor device 600 generates a thermal signal that varies the temperature of the sensing material 612. The sensor device 600 employs transducers to measure gas capture in a sensing material 612, where the amount captured is based on temperature and the concentration of gas. The transducers generate transducer measurement signals representing the amount of gas capture, and may employ various circuits to do so. A processor processes the signals to determine the amount of gas in the environment. The processor may display detected gas concentrations on the user interface 626.

In this example, the sensor device 600 is dual-mode. That is, the sensor includes a first transducer 610 and a second transducer 602. The first transducer 610 is, e.g., a mass-inertia transducer, and the second transducer 602 is, e.g., a capacitive transducer. In this example, the different transducers have different sensitivities to two different gases (e.g., carbon dioxide and water). In an alternate embodiment, the transducers could both be configured to detect the same gas. The transducers include, or are coupled to, various system elements to generate measurement signals representing the amount of gas captured by the sensing material 612. For instance, the sensor device 600 includes a first transducer readout circuit 624 that is arranged to readout the signals from the first transducer 610 (e.g., a resonant mass transducer). The sensor device 600 also includes a second readout circuit 622 arranged to read out signals from the capacitor formed by the two electrodes and the sensing material positioned between the electrodes.

The sensor device 600 includes a processor 620. The processor may be used to vary the temperature of the sensing material 612. For instance, the processor 620 may include a thermal unit 618 which comprises a proportional integral derivative (PID) temperature controller. The PID may be used to generate a thermal signal for controlling the temperature of the sensing material 612. For instance, in some embodiments, the sensor device 600 may use a PID loop with a cutoff frequency lower than modulation frequency and add sinusoidally varying current to the output of the PID. The PID controller may be thermally coupled to a thermal element 614 and a temperature sensor 616 which may be used to modulate the temperature of the transducers and sensing material 612 using the thermal signal from the processor 620.

The processor 620 may also include functionality to determine the amount of gas in the environment. The processor 620 may determine the amount of gas based on the thermal signal and the measurement signals. Depending on the configuration, in-dual mode, the processor may determine the amount of both a first gas and a second gas in the environment, or may determine the amount of only a first gas in the environment. In the former configuration, two sensing materials and transducers may be configured to corresponding to a particular type of gas to be sensed. In the latter configuration, employing two measurement signals for a signal gas generates higher fidelity gas detection.

In an example embodiment, the sensor device 600 includes a demodulation function 621, such as phase-sensitive (also known as lock-in) detection, to perform lock-in demodulation of the first transducer 610 (e.g., mass) readout signals received from the first transducer readout circuit 624. The sensor device 600 also includes a lock-in demodulation function 621 to perform lock-in demodulation 621 of the second transducer 602 (e.g., capacitor) readout signals received from the second transducer 602 (e.g., capacitor) readout circuit 622. The transducer readout signals can be demodulated by any of many known methods, implemented as an analog or digital circuit, or in software of the processor 620. The processor 620 also includes an algorithm to calculate quantity of the target gas, and optionally a humidity value, from the demodulated signals as discussed further below.

Notably, the above example demonstrates that one or more transducers may be used to determine an amount of gas in the environment. In some configurations, each of the one or more transducers is configured to determine the amounts of different gasses, while in other configurations, the one or more transducers, in aggregate, are configured to determine the amount of a particular gas.

VI. Example Gas Detection Method

Figure 7:
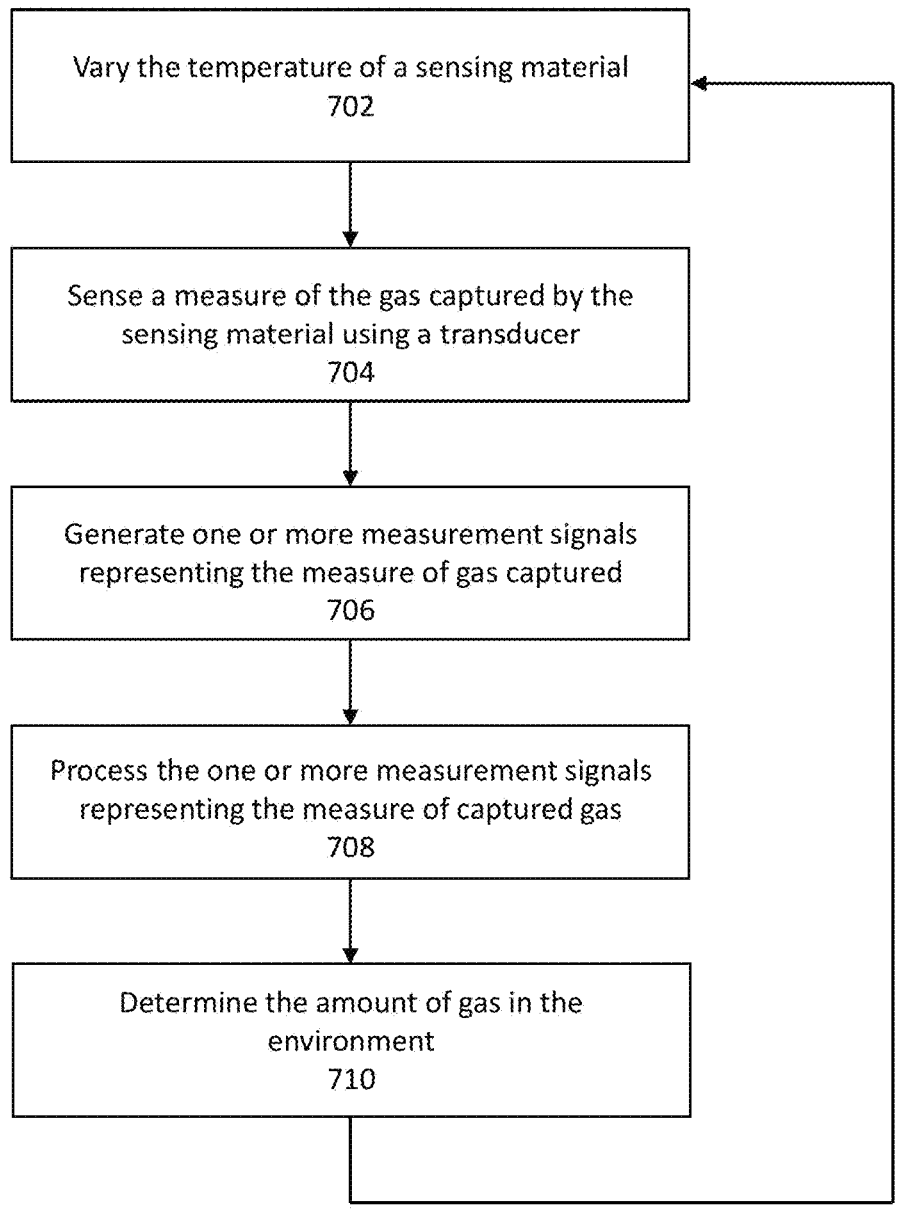
FIG. 7 illustrates a workflow method to determine an amount of gas in an environment using a sensor device, according to an example embodiment.

FIG. 7 illustrates a workflow method to determine an amount of gas in an environment using a sensor device, according to an example embodiment. The workflow may include additional or fewer steps, the steps may be performed in another order, and/or some of the steps may be repeated.

A sensor device is configured to determine an amount of gas in the environment based on transducer measurement signals and thermal signals.

The sensor device varies 702 a temperature of a sensing material. The sensing material is configured to capture the gas from the environment based on the temperature of the sensing material and an amount of the gas in the environment. The sensor device may vary the temperature using a time-varying thermal signal. For instance, the sensor device may employ the time-varying thermal signal to adjust the temperature of the sensing material using various heating and cooling elements.

The sensor device senses 704 a measure of the gas captured by the sensing material as its temperature is varied. The transducer is configured to senses changes in characteristics of the sensing material as it captures (e.g., absorb or desorb) gas The sensor device generates 706 one or more measurement signals. The measurement signals represent the measure of the gas captured by the sensing material. The measurement signal may be generated by a measurement circuit electrically coupled to the transducer (e.g., an oscillator circuit and frequency counter). The measurement circuit is configured to generate signals representing the measure of gas captured by the sensing material based on changes in characteristics of the sensing material sensed by the transducer.

The sensor device processes 708 the one or more measurement signals representing the measure of captured gas using the time-varying thermal signal. In one example, processing the measurement signals may include demodulating those signals using the time-varying thermal signals.

The sensor device determines 710 the amount of gas in the environment based on the processed on or more measurement signals. The sensor device may generate a notification if the determined amount of gas is greater than a threshold amount of gas.

The above description illustrates embodiments by way of example and not necessarily by way of limitation. Many other embodiments are possible. For example, only one sensor element was shown at a time for simplicity of understanding in the patent drawings, but arrays of sensor devices are also possible in alternative embodiments. Arrays of transducers may be functionalized with MOFs or polymer sensing materials having different properties so that the sensor array can sensitively detect and differentiate multiple target gases, chemical compounds, and even complex mixtures.

VII. Example Computer System

Figure 8:
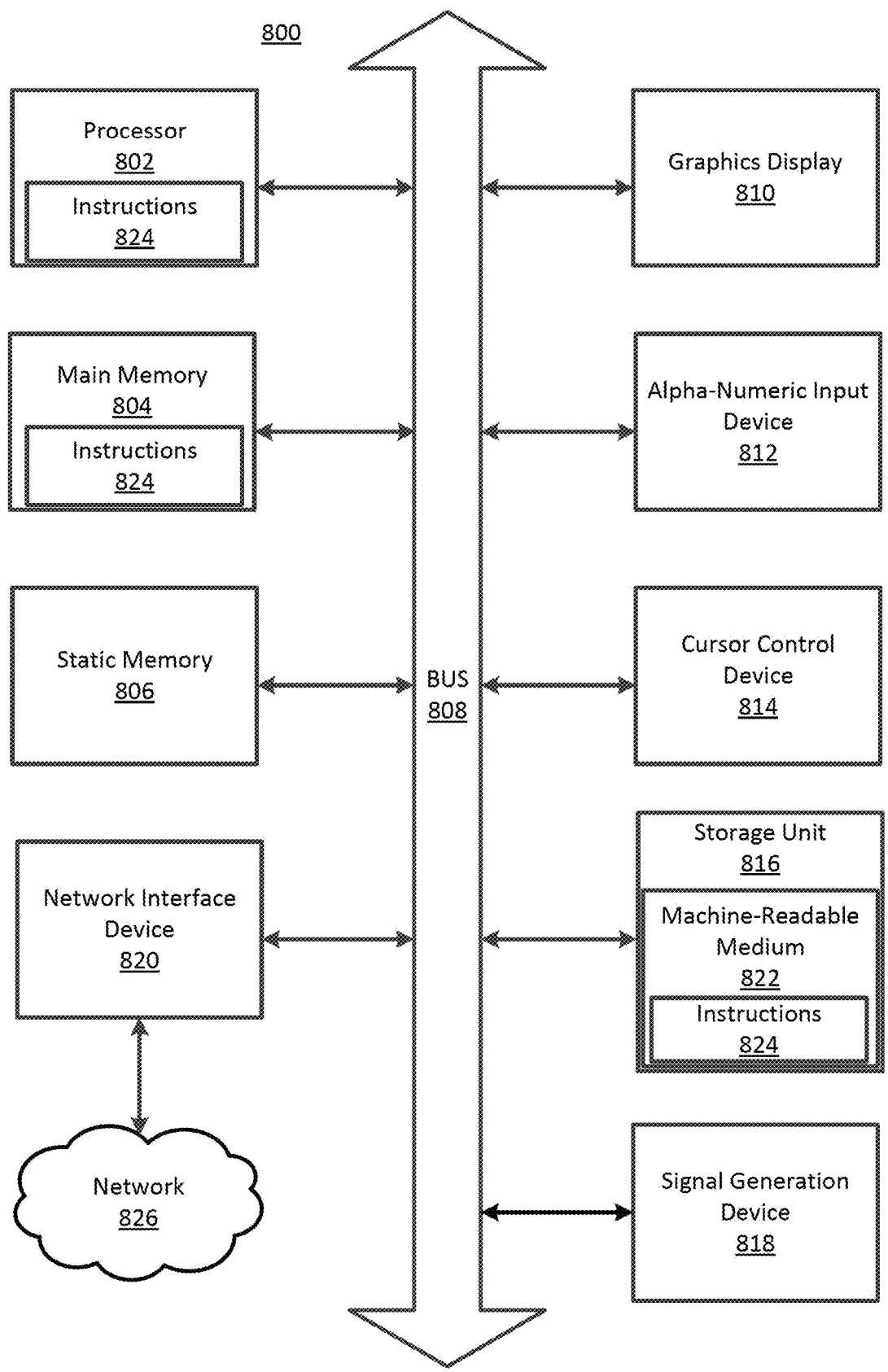
FIG. 8 illustrates a computer system, according to an example embodiment.

FIG. 8 is a block diagram illustrating components of an example machine for reading and executing instructions from a machine-readable medium, according to an example embodiment. Specifically, FIG. 8 shows a diagrammatic representation of the processors of the sensor devices described herein in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client system environment 800, or as a peer machine in a peer-to-peer (or distributed) system environment 800.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 800 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include the functionalities of modules of the system 130 described in FIG. 1. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 (e.g., network 820) via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

Accordingly, the scope of the disclosure should be determined by the following claims and their legal equivalents.

What is claimed is:

1. A sensor device for detecting a gas in an environment, the sensor device comprising:
   a sensing material configured to capture the gas from the environment based on a temperature of the sensing material and an amount of the gas in the environment;
   a thermal unit thermally coupled to the sensing material, the thermal unit configured to generate a time-varying thermal signal configured to vary the temperature of the sensing material;
   one or more transducers coupled to the sensing material, the one or more transducers configured to sense a measure of the gas captured by the sensing material and generate one or more measurement signals representing the measure of the captured gas; and
   one or more processors electrically coupled to the one or more transducers and the thermal unit, the one or more processors configured to:
      process the one or more measurement signals representing the measure of captured gas based on the time-varying thermal signal, and
      determine the amount of the gas in the environment based on the processed one or more measurement signals.

2. The sensor device of claim 1, wherein the one or more processors are configured to:
   receive the one or more measurement signals representing the measure of captured gas from the one or more transducers; and
   receive the time-varying thermal signal from the thermal unit.

3. The sensor device of claim 1, wherein:
   the thermal unit comprises at least one thermal element thermally coupling the thermal unit to the sensing material,
   the thermal unit is configured to heat or cool the sensing material using the time-varying thermal signal, and
   the thermal unit heats or cools the sensing material by driving the time-varying thermal signal to at least one thermal element.

4. The sensor device of claim 1, wherein the one or more processors comprise the thermal unit.

5. The sensor device of claim 1, wherein the one or more processors are configured to process the one or more measurement signals representing the measure of captured gas by demodulating the one or more measurement signals using the time-varying thermal signal.

6. The sensor device of claim 1, wherein the one or more processors are configured to process the one or more measurement signals representing the measure of captured gas by applying a fitting function to the one or more measurement signals and time-varying thermal signal.

7. The sensor device of claim 1, wherein the thermal unit generates the time-varying thermal signal at a frequency and the one or more processors process the one or more measurement signals by demodulating the one or more measurement signals using the frequency of the time-varying thermal signal.

8. The sensor device of claim 1, wherein the time-varying thermal signal comprises a sinusoidal wave.

9. The sensor device of claim 1, wherein the time-varying thermal signal comprises any one of a saw-wave, a square wave, a triangle wave, a non-linear signal, or a non-periodic signal as the time-varying thermal signal.

10. The sensor device of claim 1, wherein the one or more transducers comprise a mass transducer.

11. The sensor device of claim 10, wherein the mass transducer senses the measure of gas captured by the sensing material by measuring changes of a mass of the sensing material as it captures the gas.

12. The sensor device of claim 1, wherein the one or more transducers comprise a chemiresistor.

13. The sensor device of claim 12, wherein the chemiresistor comprises a first electrical contact coupled to a first side of the sensing material and a second electrical contact to a second side of the sensing material, and the chemiresistor senses the measure of gas captured by the sensing material by measuring changes in resistance of the chemiresistor when the sensing material captures the gas.

14. The sensor device of claim 1, wherein the one or more transducers comprise a chemicapacitor.

15. The sensor device of claim 14, wherein the chemicapacitor comprises a first conductive plate coupled to a first side of the sensing material and a second conductive plate coupled to a second side of the sensing material, and the chemicapacitor senses the measure of gas captured by the sensing material by measuring changes in capacitance of the chemicapacitor when the sensing material captures the gas.

16. The sensor device of claim 1, wherein the one or more transducers comprise one or more of an electrical transducer, an optical transducer, an acoustic transducer, or an inertial transducer.

17. The sensor device of claim 1, wherein the sensing material is a metal-organic framework or covalent organic framework configured to capture gas.

18. The sensor device of claim 1, wherein the gas is carbon dioxide.

19. The sensor device of claim 1, wherein the gas is methane.

20. The sensor device of claim 1, wherein the gas is hydrogen.

21. The sensor device of claim 1, wherein the one or more processors process the one or more measurement signals representing the measure of captured gas based on the time-varying thermal signal to account for a thermal drift of the sensing material in the environment.

22. A method for detecting a gas in an environment using a sensor device, the method comprising:
varying, using a time-varying thermal signal, a temperature of a sensing material, the sensing material configured to capture the gas from the environment based on the temperature of the sensing material and an amount of the gas in the environment;
sensing, using a transducer coupled to the sensing material, a measure of the gas captured by the sensing material as the temperature is varied;
generating, using a measurement circuit electrically coupled to the transducer, one or more measurement signals representing the measure of the gas captured by the sensing material;
processing, using a processor, the one or more measurement signals representing the measure of captured gas using the time-varying thermal signal; and
determining the amount of gas in the environment based on the processed one or more measurement signals.

* * * * *